United States Patent [19]
Gorse et al.

[11] Patent Number: 5,173,013
[45] Date of Patent: Dec. 22, 1992

[54] COMBINED HOLE CUTTING AND CHAMFERING TOOL

[75] Inventors: John M. Gorse, Euclid; Joseph A. Kovach, Aurora, both of Ohio

[73] Assignee: Eaton Corporation, Cleveland, Ohio

[21] Appl. No.: 843,035

[22] Filed: Feb. 28, 1992

[51] Int. Cl.$^5$ .................. B23B 51/08; B23B 51/10
[52] U.S. Cl. ................... 408/22; 408/224; 408/713
[58] Field of Search ............ 408/22, 26, 27, 224, 408/225, 230, 223, 713, 144, 145

[56] References Cited

U.S. PATENT DOCUMENTS

| | | | |
|---|---|---|---|
| 1,471,866 | 10/1923 | Simpson | 408/225 X |
| 2,978,846 | 4/1961 | Barron | 408/145 X |
| 4,505,626 | 3/1985 | Benhase | 408/224 |
| 4,589,310 | 5/1986 | Neumann | 82/1.4 |
| 4,589,805 | 5/1986 | Duffner | 408/224 X |
| 4,720,218 | 1/1988 | Defries et al. | 408/145 |
| 4,842,451 | 6/1989 | Dugger | 408/230 X |

Primary Examiner—Steven C. Bishop
Attorney, Agent, or Firm—A. E. Chrow

[57] ABSTRACT

A combined hole cutting and chamfering tool is provided that in a preferred embodiment referenced by numeral (100) features a body member (2) having a lead section ("A") to which is secured a cutting bit (4) having a machining element such as a hole cutting edge (6). Spaced axially from section ("A") is a chamfering section ("B") having at least one chamfer machining element such as cutting edge (12) of a cutting bit (14) facing towards section ("B") and at least one chamfer machining element such as cutting edge (8) of cutting bit (10) facing away from section ("A") and closer thereto than cutting edge (12). Tool (100) is operative to cut a hole (18) through a workpiece such as a plate and then chamfer edges surrounding the hole on opposite sides of the workpiece from one side without having to remove tool (100) from hole (18).

7 Claims, 2 Drawing Sheets

COMBINED HOLE CUTTING AND CHAMFERING TOOL

INTRODUCTION

This invention relates generally to a rotary tool that is operative to cut a hole through a work piece and chamfer the respective edges surrounding the hole on opposite sides of the workpiece and more particularly to such tool being able to provide both of the chamfers from one side of the workpiece without having to remove the tool from the hole. In another embodiment the tool of the invention is further operative to provide a boring function as well as the hole cutting and chamfering functions.

BACKGROUND OF THE INVENTION

It is common to chamfer the edge surrounding an opening such as a hole in a workpiece if for no other reason to minimize the possibility of receiving a cut from what might otherwise be a sharp edge or to facilitate insertion of pins and the like into the hole or to provide a mating surface for screws and other fasteners.

There are numerous chamfering tools available that enable one to separately chamfer an edge surrounding a hole in a workpiece. Other tools are available that combine a drilling operation with a single chamfering operation that enables one to chamfer the edge surrounding the hole on the same side from which the hole has been drilled but requires either turning the workpiece over or transporting that tool to the opposite side in order to chamfer the edge surrounding the hole on the opposite side of the workpiece in instances where the hole extends all the way through to the opposite side and a chamfer is desired.

The practice of having to chamfer edges surrounding a hole on opposite sides of a workpiece separately is time consuming and costly and can be extremely so for repetitive operations with large number of units involved even when separate chamfering tools are employed on both sides of the workpiece.

SUMMARY OF THE INVENTION

Accordingly, it is an object of this invention to provide a combined hole cutting and chamfering tool that enables one to cut a hole through a workpiece and then chamfer the edges surrounding the hole on opposite sides of the workpiece without having to remove the tool from the hole.

It is another object of this invention to provide a combined hole cutting and chamfering tool able to lessen time and expense required to separately chamfer edges surrounding a hole on opposite sides of a workpiece by enabling the hole to be cut and the opposite side edges to be chamfered from one side of the workpiece without having to remove the tool from the hole.

It is yet another object of this invention to provide a tool able to cut a hole through a workpiece, bore the hole, and chamfer edges surrounding the hole on opposite sides of the workpiece in one operation without having to remove the tool from the hole.

It is still a further object of this invention to provide a tool able to cut a hole through a workpiece and simultaneously chamfer edges surrounding the hole on opposite sides of the workpiece without having to remove the tool from the hole.

DESCRIPTION OF SOME PREFERRED EMBODIMENTS

Figure 1:
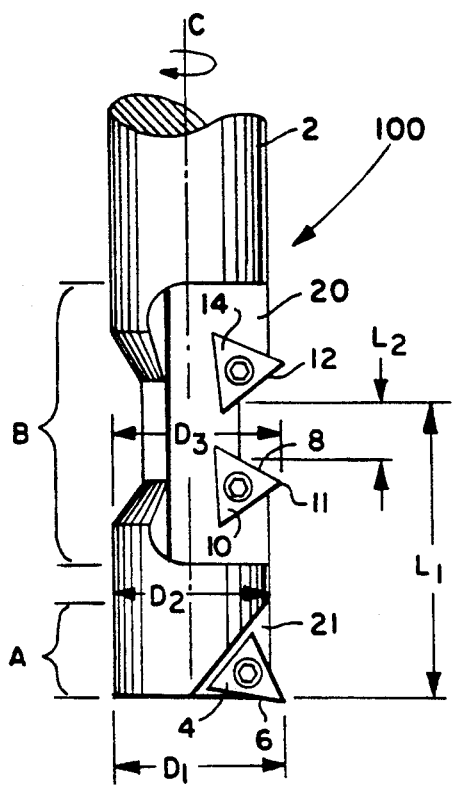
FIG. 1 is a partial side elevation view of a combined hole cutting and chamfering tool 100 made in accordance with the invention.

In FIG. 1, tool 100 is a preferred embodiment of the combined hole cutting and chamfering tool of the invention. Tool 100 is a rotary tool having a body member 2 having a central rotational axis "C" about which tool 100 rotates during the hole cutting and chamfering functions.

The mechanism and control circuits by which the tool of the invention is rotated and moved axially and one or both the tool and the workpiece are moved laterally relative the other in what is called an interpolation function in the trade is not within the scope of this invention. Clearly any method is suitable that causes the tool of the invention to operate in the manner herein described and such may also be computer controlled such as by CNC tape control where appropriate.

Returning to FIG. 1, body member 2 has a lead section referenced by letter "A". Lead section "A" includes a cutting bit 4 secured to body member 2 on a flat surface referenced by numeral 21 since body member 2 has a generally cylindrical configuration as shown in FIG. 1.

Cutting bit 4 has a cutting edge 6 operative to cut a hole having a diameter referenced by letter "$D_1$" in or through a workpiece upon rotation of body member 2. Cutting bit 4 is preferably releasably secured to surface 21 of body member 4 by a threaded screw or the like so that it can easily be replaced when cutting edge 6 is worn or rotated to present a sharp cutting edge which is commonly the case for the triangular or other shaped cutting bits used in the trade such as shown in FIGS. 1–3 and 7.

Body member 2 includes a chamfering section referenced by letter "B" that may abutt lead section "A" but is preferably spaced axially apart from lead section "A". Chamfering section "B" includes a first chamfer cutting edge 12 that faces towards lead section "A" and a second chamfer cutting edge 8 that faces away from lead section "A" and is closer thereto than cutting edge 12.

Cutting edges 8 and 12 are edges of cutting bits 10 and 14 that are respectively secured to a flat surface 20 within chamfering section B is shown in FIG. 1. Like cutting bit 4, cutting bits 10 and 14 are preferably releasably secured to surface 20 and are preferably triangular in shape so they can be rotated to present a sharp cutting edge when the cutting edges referenced by numerals 8 and 12 become worn.

It should be noted that the corner of either or both cutting bits 10 and 14, such as referenced by numeral 11 for cutting bit 10, can be used to either bore or counterbore the hole cut through the workpiece by cutting edge 6 of bit 4 provided that in the event a counter-bore is cut, cutting edge 12 is still able to chamfer the edge of the workpiece surrounding the counter-bore.

In order for tool 100 to perform the chamfering function, body member 2 is required to have a breadth (diameter when body member 2 is cylindrical) in a place substantially transverse to rotational axis "C" that is no greater and preferably less than hold diameter "$D_1$" by a predetermined clearance than diameter "$D_1$" of the hole cut by cutting edge 6 through the workpiece.

In the case of tool 100, corner 11 of cutting bit 10 extends outwardly from body member 2 for purposes such as a boring function as previously described. In such instances, the machining diameter referenced by letter "$D_3$" must likewise be no greater and preferably less than hole diameter "$D_1$" by a predetermind clearance so that body member 2 can pass through the cut hole at least for length "$L_1$" previously described so that chamfer cutting edge 12 of bit 14 is able to chamfer the edge surrounding the hole on the input or upper side of the workpiece sch as referenced by numeral 17.

Figure 2:
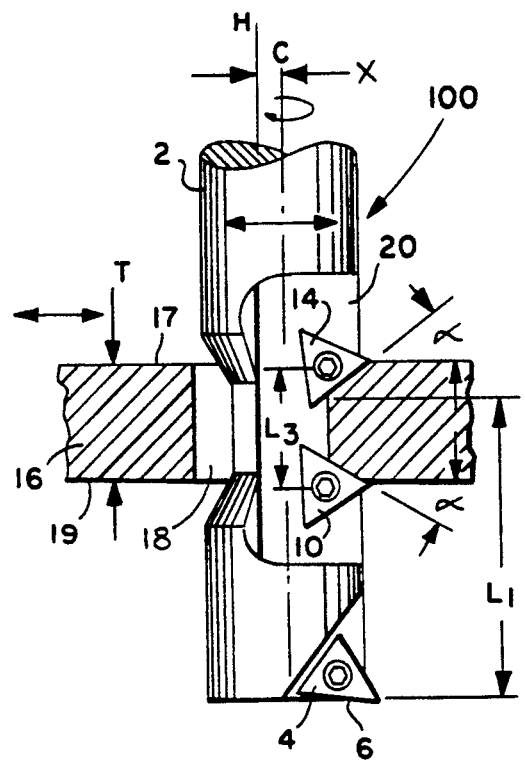
FIG. 2 is a partial side elevation view of tool 100 of FIG. 1 after it has cut a hole through a partially sectioned workpiece 16.

In FIG. 2, cutting edge 6 of bit 4 has cut a hole 18 having a central axis "H" through a workpiece 16 having a defined thickness "T" from one side referenced by numeral 17 to an opposite side referenced by numeral 19. Bits 10 and 14 are spaced axially apart a distance referenced by letter "$L_3$" that enables their respective cutting edges 11 and 12 referenced in FIG. 1 to simultaneously chamfer the edges surrounding hole 18 on both sides of workpiece 16 which is shown in FIGS. 2 and 3 as a flat plate but which may of course have any configuration through which the tool of the invention is able to cut a hole from one side through to the opposite side.

Cutting edges 10 and 12 are disposed in respective angular relationship to rotational axis "C" to provide respective chamfer angles alpha ($\alpha$) shown in FIG. 2 upon lateral movement of one or both body member 2 and workpiece 16 relative the other a distance "X" as shown by the arrows in FIG. 2 that are substantially transverse to rotational axis "C".

Figure 3:
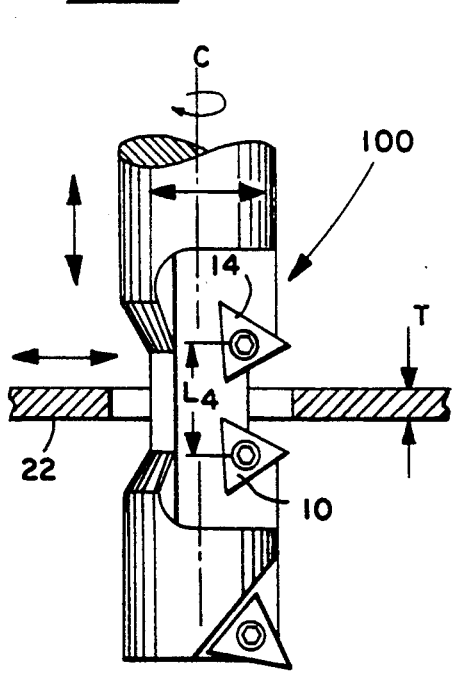
FIG. 3 is a partial side elevation view of tool 100 of FIGS. 1 and 2 after having cut a hole through a partially sectioned workpiece 22.

FIG. 3 illustrates that chamfer machining elements such as bits 10 and 14 are not required to simultaneously chamfer the edges surrounding the cut hole on opposite sides of the workpiece but may be adapted to chamfer the edges one at a time such as where the axial length "$L_4$" is sufficiently greater than thickness "T" of the workpiece to enable such to occur or when the length remains the same as for "$L_3$" in FIG. 3 but when the workpiece such as referenced by numeral 22 in FIG. 3 has a thinner thickness "T" than for workpiece 16 in FIG. 3.

FIGS. 4-8 illustrate other preferred embodiments of the tool of the invention.

Figure 4:
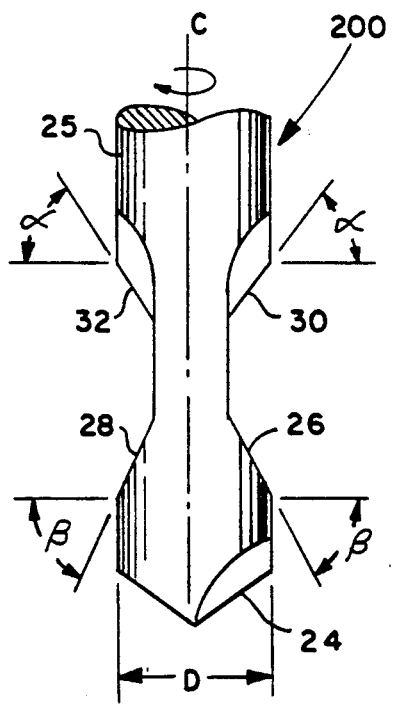
FIGS. 4–8 are respective partial side elevation views of tools 200, 300, 400, 500 and 600 made in accordance with the invention.

In FIG. 4 tool 200 has a body member 25 having a generally cylindrical configuration but which does not use removable cutting bits as machining elements but rather has cutting edge 24 and chamfer cutting edges referenced by numerals 16, 28, 30 and 32 that are machined on body member 25. Tool 200 also illustrates that the tool of the invention can, if desired, have more than one chamfer cutting edge facing towards the lead section such as cutting edges 30 and 32 and may also have more that one chamfer cutting edge facing away from the lead section such as cutting edges 26 and 28.

Tool 200 of FIG. 4 also illustrates that the chamfer machining elements need not provide the same chamfer angle on opposite sides of the hole cut through by cutting edge 24 such as like edges 30 and 32 are oriented relative axis "C" to provide chamfer angle alpha and edges 26 and 28 are oriented relative axis "C" to provide chamfer angle beta ($\beta$)

It is to be noted that the design of tool 200 is such that it has a substantially the same diameter "D" throughout both the lead and chamfer sections.

Figure 5:
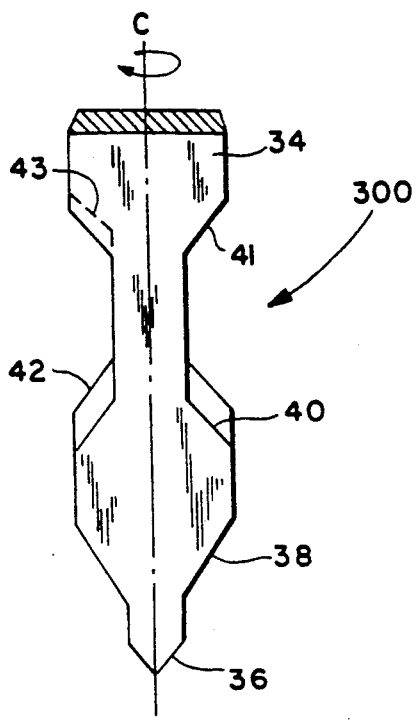

FIG. 5 shows a tool 300 of the invention where body member 34 has a substantially rectangular cross-sectional configuration such as a spade type drill. In this case, the lead section includes two hole cutting edges referenced by numerals 36 and 38 and the chamfer cutting edges in the chamfer section on referenced by numerals 40, 41, 42, and 43.

Figure 6:
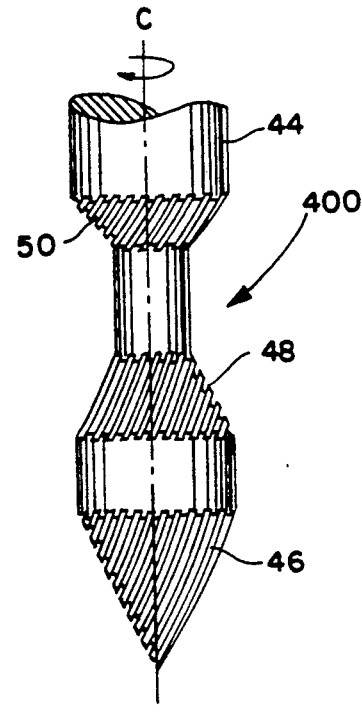

Tool 400 of FIG. 6 illustrates where the holes and chamfer machining elements may be in the form of a plurality of spiral cutting edges such as associated with a conventional drill that for body member 44 in FIG. 6 are referenced by numeral 46 for the hole cutting edges and by numerals 48 and 50 for the respective chamfer cutting edges.

Figure 7:
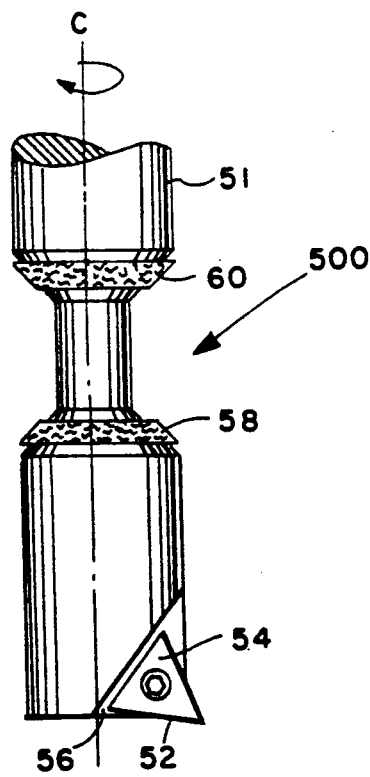

Tool 500 of FIG. 7 illustrates that the term "chamfer machining elements" as used herein includes not only cutting edges such as associated with cutting bits and drills but also includes grinding surfaces operative to grind one or both the opposite side chamfers such as where body member 51 of FIG. 7 has a hole cutting edge 52 of a cutting bit 54 secured to surface 56 and has chamfer machining elements in the form of abrasive grinding surfaces referenced by numerals 58 and 60.

Figure 8:
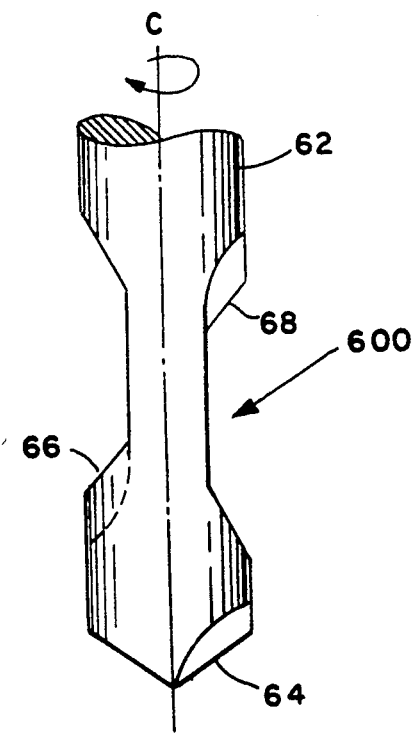

FIG. 8 shows a tool 600 having a body member 62 having a generally cylindrical cross-section having a hole cutting edge 64 in the lead section and chamfer cutting edges 66 and 68 in the chamfer section that are not in spaced apart facing relationship to illustrate that the first and second chamfer machining elements can, if desired, be on opposite sides of the body member.

It is to be understood that the drawings and descriptive matter are in all cases to be interpreted as merely illustrative of the principles of the invention rather than limiting in any way, and that various changes may be made to the various elements to achieve like or similar results without departing from the spirit of the invention or the scope of the appended claims.

What is claimed is:

1. A combined hole cutting and chamfering tool comprising a body member having a central rotational axis:

said body member having a lead section having at least one hole cutting edge operative to cut a hole of selected diameter through a workpiece having a finite thickness upon rotary advancement of the hole cutting edge therethrough from one side to an opposite side;

said body member having a chamfering section spaced axially apart from the lead section and having at least one first and at least one second chamfering machining element spaced axially apart from each other with the first chamfer machining element facing towards the lead section and the second chamfer machining element facing away from the lead section and closer thereto than the first chamfer machining element;

said first and second chamfer machining elements disposed in respective angular relationship to the rotational axis operative to provide a chamfer angle respectively desired at the workpiece edge surrounding the one side and opposite side of the hole therethrough upon machining engagement therewith with at least one of said first and second chamfer machining elements additionally operative to provide a boring function;

at least said second chamfer machining element having a maximum machining diameter and said body member having a maximum breadth in a plane substantially transverse to the rotational axis that is no greater than the hole diameter from the lead section to at least the axial location along the body member in registration with an inner diameter of the chamfer to be machined by the first chamfering machining element; and said first and second chamfer machining elements spaced axially apart from each other such that, upon cutting the hole through the workpiece either; (i) selected lateral movement of one or both the body member and the workpiece relative the other enables the first and second chamfer machining elements to respectively machine the one side and opposite side workpiece chamfers simultaneously from the one side thereof upon rotation of the body member or; (ii) selected combinations of lateral and axial movement of one or both of the body member and workpiece relative the other enables the first and second chamfer machining elements to machine the one side and opposite side chamfers one at a time from the one side of the workpiece upon rotation of the body member and optionally provide the boring function when such is desired.

2. The tool of claim 1 wherein the first and second chamfer machining elements are cutting edges.

3. The tool of claim 1 wherein at least one of the hole cutting edge and the first and second chamfer machining elements is on an edge of a cutting bit secured to the body member.

4. The tool of claim 1 wherein the hole cutting edge and first and second chamfer machining elements are respective edges of cutting bits respectively secured to the body member.

5. The tool of claim 1 wherein at least one of the first and second chamfer machining elements is a grinding surface.

6. The tool of claim 1 wherein both the first and second chamfer machining elements are grinding surfaces.

7. A combined hole cutting and chamfering tool comprising a body member having a central rotational axis:

said body member having a lead section having at least one hole cutting edge operative to cut a hole of selected diameter through a workpiece having a finite thickness upon rotary advancement of the hole cutting edge therethrough from one side to an opposite side;

said body member having a chamfering section spaced axially apart from the lead section and having at least one first and at least one second chamfering grinding surface spaced axially apart from each other with the first chamfer grinding surface facing towards the lead section and the second chamfer grinding surface facing away from the lead section and closer thereto than the first chamfer grinding surface, said first and second chamfer grinding surfaces disposed in respective angular relationship to the rotational axis operative to provide a chamfer angle respectively desired at the workpiece edge surrounding the one side and opposite side of the hole therethrough upon grinding engagement therewith;

at least said second chamfer grinding surface having a maximum diameter and said body member having a maximum breadth in a plane substantially transverse to the rotational axis that is no greater than the hole diameter from the lead section to at least the axial location along the body member in registration with an inner diameter of the chamfer to be ground by the first chamfer grinding surface; and said first and second chamfer grinding surfaces spaced axially apart from each other such that, upon cutting the hole through the workpiece either; (i) selected lateral movement of one or both the body member and the workpiece relative to the other enables the first and second chamfer grinding surfaces to respectively grind the one side and opposite side workpiece chamfers simultaneously from the one side thereof upon rotation of the body member or; (ii) selected combinations of lateral and axial movement of one or both of the body member and workpiece relative the other enables the first and second chamfer grinding surfaces to grind the one side and opposite side chamfers one at a time from the one side of the workpiece upon rotation of the body member.

* * * * *